Patented Oct. 23, 1951

2,572,558

UNITED STATES PATENT OFFICE 2,572,558

MINERAL OIL CONTAINING ALKYLATED POLYSTYRENE

John Mann Butler, Dayton, Ohio, assignor to Monsanto Chemical Company, St. Louis, Mo., a corporation of Delaware No Drawing. Application January 29, 1948, Serial No. 5,202

8 Claims. (Cl. 252—59)

This invention relates to a resinous product having unusual utility in increasing the viscosity index of lubricating oils. More specificially it relates to an oil soluble alkylated polystyrene which can be prepared from inexpensive and readily available raw materials.

It is well known that some alkylated polystyrenes are soluble in many petroleum fractions, and have a beneficial effect on the viscosity characteristics of those products. It is also known that polystyrenes which have been alkylated by the substitution thereon of isopropyl radicals are not generally useful because of their gel-like nature, and because they are insoluble in most of the oil stocks requiring modification with respect to viscosity characteristics.

Accordingly, it is the purpose of this invention to provide a propylated polystyrene of general utility by reason of its solubility in practically all types of petroleum stocks. A further purpose of this invention is to provide an inexpensive method of increasing the viscosity index of lubricating oils.

It has been found that when polystyrene is alkylated with isopropyl chloride, propylene, or by other methods for substituted isopropyl groups on the benzene ring of the polystyrene, good viscosity index improvers are obtained if the reaction is continued to the desired extent. It is essential to have an average of at least 1.5 isopropyl radicals substituted on each styrene unit, and it is desirable to have an average of from two to three of the substituents. Although it is possible, it is generally impracticable to substitute an average of more than three isopropyl groups. Through the practice of this invention excellent viscosity modifiers are obtained which are soluble in all of the commercially available lubricating oil stocks. Furthermore, the new products are relatively less expensive than the viscosity index improvers now in commercial use. The polystyrene used in the preparation of the new viscosity index modifiers is preferably of high molecular weight, for example a polystyrene having an average molecular weight between 20,000 and 100,000. Lower molecular weight polystyrene may be used but the beneficial results achieved are not as pronounced.

The polystyrene is propylated by the use of either isopropyl chloride or propylene, in the presence of a Friedel and Crafts catalyst, such as zinc chloride, aluminum chloride, boron trifluoride and hydrofluoric acid. The reaction is preferably conducted in the presence of a suitable solvent, for example nitrobenzene, o-dichlorobenzene, chlorobenzene, ethylene dichloride, etc. The reactions are conducted until at least the desired average of 1.5 isopropyl units per unit of styrene has been absorbed, this being determined by gradually adding a measured quantity of reagents and continuing until the reaction is completed.

The new viscosity improvers are used in the manner well known to the art, the quantity added to the petroleum stock depending upon the nature of the oil stock, and the extent of modification required. In general from 0.2 percent to 6.0 percent by weight will produce a substantial improvement in the viscosity index of the oil product, although more or less can be used.

Further details of the preparation of the new products and their use in increasing the viscosity index of petroleum products are set forth with respect to the following specific examples.

Example 1

A glass reaction flask, provided with a gas inlet tube opening into the bottom of the flask, was charged with 150 grams of ten percent by weight o-dichlorobenzene solution of polystyrene having an average molecular weight of 70,000. Then 15 grams of nitrobenzene, 3 grams of anhydrous aluminum chloride, and 2 grams of isopropyl chloride were added thereto. The reaction flask was heated to 40° C. and while continuously stirring propylene gas was passed through the reaction mass. The temperature of the flask was maintained between 44 and 48° C. for three hours in which time 7.0 grams of propylene had been absorbed. At this time one gram of aluminum chloride and one gram isopropyl chloride were added, and the propylene addition continued. After two hours a total of 14.5 grams of propylene had been absorbed and further introduction of propylene was discontinued. The solution was hydrolyzed by treating with dilute hydrochloric acid and then washed with water. The polymer was separated by pouring the washed solution into ethanol with vigorous stirring. The propylated polystyrene was a white fluffy powder after drying, and was soluble in mid-continent solvent refined oil and in a S. A. E. 10 Rodessa oil of 20° F. pour point.

The following table shows the increase in the kinematic viscosities at 100° F. and 210° F. and the improvement in the viscosity index by the use of proportions of from 0.5 to 3 percent by weight of the propylated styrene so prepared.

| Polymer Weight Percent | K. V. in Centistokes | | Viscosity Index |
|---|---|---|---|
| | 100° F. | 210° F. | |
| 0.0 | 29.62 | 5.10 | 111.8 |
| 0.5 | 35.84 | 6.29 | 132.1 |
| 1.0 | 43.61 | 7.58 | 137.5 |
| 2.0 | 63.17 | 10.87 | 142.9 |
| 3.0 | 89.70 | 15.02 | 143.3 |

Example 2

A 150 gram portion of ten percent solution of polystyrene in o-dichlorobenzene, 20 grams of nitrobenzene and 5 grams of aluminum chloride were charged to a glass reaction flask provided with a dropping funnel and a means for continuous stirring. While maintaining the temperature at 35 to 45° C., 35 grams of isopropyl chloride were added over a period of 35 minutes while stirring vigorously. The reaction mass was poured into dilute hydrochloric acid solution and the polymer solution was separated from the acid and washed with water. The polymer was precipitated by adding with vigorous agitation to ethyl alcohol. The resulting propylated polystyrene was soluble in a Mid-Continent solvent refined oil, and the products so prepared manifested increased viscosity indices.

Example 3

To demonstrate the relative value of highly propylated polystyrene as a viscosity index improver, tests were made with polyisobutylene and long chain alkylated polystyrene. The tests were conducted on a Mid-Continent solvent refined oil having a kinematic viscosity of 5.10 centistokes at 210° F. and 28.62 centistokes at 100° F. The following tables demonstrate the results observed.

| Weight Per cent Poly-isobutylene | K. V. in Centistokes | | Viscosity Index |
|---|---|---|---|
| | 100° F. | 210° F. | |
| 0.0 | 29.62 | 5.10 | 111.8 |
| 1.0 | 32.90 | 5.65 | 121.5 |
| 3.0 | 45.03 | 7.44 | 131.2 |
| 6.0 | 70.09 | 10.86 | 134.5 |
| Propylated Polystyrene having 2.4 substituents | | | |
| 0.5 | 35.84 | 6.29 | 132.1 |
| 1.0 | 43.61 | 7.58 | 137.5 |
| 2.0 | 63.17 | 10.87 | 142.9 |

| Polystyrene Alkylated with a long chain hydrocarbon olefine Weight Percent | K. V. in Centistokes | | Viscosity Index |
|---|---|---|---|
| | 100° F. | 210° F. | |
| 0.5 | 36.52 | 6.25 | 128.2 |
| 1.0 | 44.24 | 7.60 | 136.7 |
| 2.0 | 64.20 | 10.99 | 142.8 |
| 3.0 | 90.23 | 14.97 | 143.0 |

These tests demonstrate that the very inexpensive and abundantly available propylene can be used to make an alkylated polystyrene which is superior to polyisobutylene and substantially equivalent to alkylated polystyrenes made from the more costly long chain hydrocarbon olefines.

Although the invention has been described with respect to specific embodiments thereof, it is not intended that the details shall be construed as limitations upon the scope of the invention except to the extent incorporated in the following claims.

I claim:

1. A propylated polystyrene having an average of in excess of 1.5 isopropyl substituents for each styrene unit of polystyrene, said polystyrene having an average molecular weight in excess of 20,000.

2. A propylated polystyrene having an average of in excess of two isopropyl substituents for each styrene unit of polystyrene, said polystyrene having an average molecular weight in excess of 20,000.

3. A composition of matter which comprises a petroleum oil fraction and from 0.2 to 6 per cent by weight, based on the oil, of a propylated polystyrene having an average of in excess of 1.5 isopropyl substituents per unit of styrene contained in the polystyrene, said polystyrene having an average molecular weight in excess of 20,000.

4. A composition of matter which comprises a petroleum oil fraction and from 0.2 to 6 per cent by weight, based on the oil, of a propylated polystyrene having an average of in excess of two isopropyl substituents per unit of styrene contained in the polystyrene, said polystyrene having an average molecular weight in excess of 20,000.

5. A petroleum product having an improved viscosity characteristic which comprises a petroleum oil fraction and from 0.2 to 6 per cent by weight, based on the oil, of a polystyrene having an average of in excess of 1.5 isopropyl principal substituent per styrene unit, said polystyrene having an average molecular weight in excess of 20,000.

6. A petroleum product having an improved viscosity characteristic which comprises a petroleum oil fraction, and from 0.2 to 6 per cent by weight, based on the oil, of a polystyrene having an average of in excess of two isopropyl principal substituents per styrene unit, said polystyrene having an average molecular weight in excess of 20,000.

7. A method of preparing a modified polystyrene which comprises mixing polystyrene having an average molecular weight in excess of 20,000 with a compound of the group consisting of isopropyl chloride and propylene in the presence of a Friedel-Craft catalyst, continuing the reaction until an average of more than 1.5 isopropyl substituents are substituted on each benzene ring of the polystyrene, and separating the resulting polymer.

8. A method of preparing a modified polystyrene which comprises mixing polystyrene having an average molecular weight in excess of 20,000 with a compound of the group consisting of isopropyl chloride and propylene in the presence of a Friedel-Crafts catalyst, continuing the reaction until an average of more than 2 isopropyl substituents are substituted on each benzene ring of the polystyrene, and separating the resulting polymer.

JOHN MANN BUTLER.

REFERENCES CITED

The following references are of record in the file of this patent:

UNITED STATES PATENTS

| Number | Name | Date |
|---|---|---|
| 2,072,120 | Mikeska | Mar. 2, 1937 |
| 2,213,423 | Wiezevich | Sept. 3, 1940 |
| 2,282,456 | Christmann | May 12, 1942 |
| 2,349,136 | Britton et al. | May 16, 1944 |
| 2,421,082 | Pier | May 29, 1947 |